(12) United States Patent
Kini et al.

(10) Patent No.: US 8,018,863 B2
(45) Date of Patent: Sep. 13, 2011

(54) REDUCING CC MESSAGE TRANSMISSION IN A PROVIDER NETWORK

(75) Inventors: Sriganesh Kini, Fremont, CA (US); Rishi Mehta, San Jose, CA (US)

(73) Assignee: Telefonaktiebolaget L M Ericsson, Stockholm (SE)

( * ) Notice: Subject to any disclaimer, the term of this patent is extended or adjusted under 35 U.S.C. 154(b) by 282 days.

(21) Appl. No.: 12/207,065

(22) Filed: Sep. 9, 2008

(65) Prior Publication Data
US 2010/0061252 A1  Mar. 11, 2010

(51) Int. Cl.
*G01R 31/08* (2006.01)

(52) U.S. Cl. ............... 370/248; 370/230.1; 370/231; 370/236.1; 370/236.2; 370/241.1; 370/249; 709/224; 709/225; 709/226

(58) Field of Classification Search .......... 370/229–235, 370/235.1, 236, 236.1, 236.2, 241, 241.1, 370/242, 243, 244, 245, 250, 395.61, 395.64, 370/395.65, 248, 249; 709/223–226
See application file for complete search history.

(56) References Cited

U.S. PATENT DOCUMENTS

| | | | | |
|---|---|---|---|---|
| 6,137,779 | A * | 10/2000 | Miller et al. ................ | 370/236 |
| 6,273,622 | B1 * | 8/2001 | Ben-David .................. | 709/230 |
| 6,771,600 | B2 * | 8/2004 | Kawarai et al. ............. | 370/230 |
| 7,161,907 | B2 * | 1/2007 | Mott ........................... | 370/232 |
| 7,672,245 | B2 * | 3/2010 | Yasuie et al. ................ | 370/249 |
| 2002/0154641 | A1 * | 10/2002 | McGowan .................... | 370/401 |
| 2005/0099954 | A1 | 5/2005 | Mohan et al. | |
| 2005/0180419 | A1 | 8/2005 | Park et al. | |
| 2007/0263640 | A1 | 11/2007 | Finn | |
| 2008/0219172 | A1 * | 9/2008 | Mohan et al. ............. | 370/241.1 |
| 2009/0109861 | A1 * | 4/2009 | Kini et al. .................. | 370/242 |
| 2009/0303996 | A1 * | 12/2009 | Takase et al. .............. | 370/390 |

OTHER PUBLICATIONS

IEEE Standard for Local and Metropolitan Area Networks, Virtual Bridged Local Area Networks, Amendment 5: Connectivity Fault Management, IEEE Computer Society, IEEE Std 802.1ag, Dec. 17, 2007, 260 pages.
PCT International Search Report for PCT/US2009/055944, mailed Nov. 17, 2009, 9 pages.

* cited by examiner

*Primary Examiner* — Christopher P Grey
(74) *Attorney, Agent, or Firm* — Blakely, Sokoloff, Taylor & Zafman LLP (57) ABSTRACT

A method and apparatus for reducing the number of CC messages transmitted in a provider network. In one embodiment of the invention, a first service provider network element receives CC messages from a first customer network at a first periodicity rate. The first service provider network element stores the received CC messages and reduces the first periodicity rate to create a second periodicity rate that is smaller than the first periodicity rate. The first service provider network element transmits CC messages to a second service provider network element through the provider network at the second periodicity rate. Other methods and apparatus are also described.

13 Claims, 8 Drawing Sheets

REDUCING CC MESSAGE TRANSMISSION IN A PROVIDER NETWORK

BACKGROUND

1. Field

Embodiments of the invention relate to the field of network processing; and more specifically to transmission of CC (Connectivity Check) messages.

2. Background

CC (Connectivity Check) messages, described in Institute of Electrical and Electronics Engineers (IEEE) standard 802.1ag-2007 "IEEE Standard for Local and metropolitan area networks—Virtual Bridged Local Area Networks Amendment 5: Connectivity Fault Management", Dec. 17, 2007, are used to detect the status between points in a network (e.g., Maintenance End Points (MEPs)). The CC messages are multicast messages that are sent between the end points at a periodic rate (e.g., every 3.3 milliseconds). CC messages are sent by each endpoint that is being monitored within each service instance in an Ethernet service network (e.g., Virtual Private LAN Service (VPLS), Provider Backbone Bridges (PBB) networks). The service instance may include endpoints across a wide area, such as in a Metro Area Network (MAN) or a Wide Area Network (WAN). CC messages for the service instance may be transmitted across MAN or WAN links to reach the corresponding end point.

Typically, CC messages in an Ethernet service network are transmitted over the transport network (e.g., over MAN or WAN links) in a similar fashion as any other frame received over the service network. Thus, since CC messages are typically sent at a high periodic rate, and as the number of service instances increases, bandwidth of the transport network may be used to transmit a large number of CC messages.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Some network elements are multiple services network elements which provide support for multiple networking functions (e.g., routing, bridging, switching, Layer 2 aggregation, and subscriber management, or any combination, and/or providing support for multiple services (e.g., data, voice, and video). Subscriber computer end stations (e.g., workstations, laptops, palm tops, mobile phones, smartphones, multimedia phones, portable media players, etc.) access content/services provided over the Internet and/or content/services provided on virtual private networks (VPNs) overlaid on the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, subscriber computing end stations are coupled (e.g., through customer premise equipment coupled to an access network (wired or wirelessly) to edge network elements, which are coupled through one or more core network elements to the server computing end stations.

Some network elements support the configuration of multiple contexts. As used herein, each context includes one or more instances of a virtual network element (e.g., a virtual router, virtual switch, or a virtual bridge). Each context typically shares one or more computing resources (e.g., memory, processing cycles, etc.) with other contexts configured on the network element, yet is independently administrable. For example, in the case of multiple virtual routers, each of the virtual routers shares computing resources, but is separate from those other virtual routers regarding its management domain, authentication, authorization, and accounting (AAA) name space, IP address, and routing database(es).

A method and apparatus for reducing the number of CC messages transmitted in an Ethernet service network is described. In one embodiment of the invention, a first Ethernet service provider network element (e.g., Provider Edge (PE) network element, Provider Backbone Edge Bridge (PBEB)) receives CC messages for a first end point of a service instance at a first periodicity rate. The first Ethernet service provider network element caches the received CC messages, and adds a repeat count to a CC message to be transmitted to a second Ethernet service provider network element across an intra-Ethernet service provider network link (e.g., MAN or WAN link). The first Ethernet service provider network element transmits the modified CC message to the second Ethernet service provider network element at a second periodicity rate that is less than the first periodicity rate. The second Ethernet service provider network element caches the modified CC message and generates and transmits a repeat count number of CC messages to a second end point of the service instance at the first periodicity rate.

In another embodiment of the invention, upon determining that CC messages have not been received from the first end point, the first Ethernet service provider network element triggers the second Ethernet service provider network element to stop transmitting CC messages to the second end point.

Figure 1:
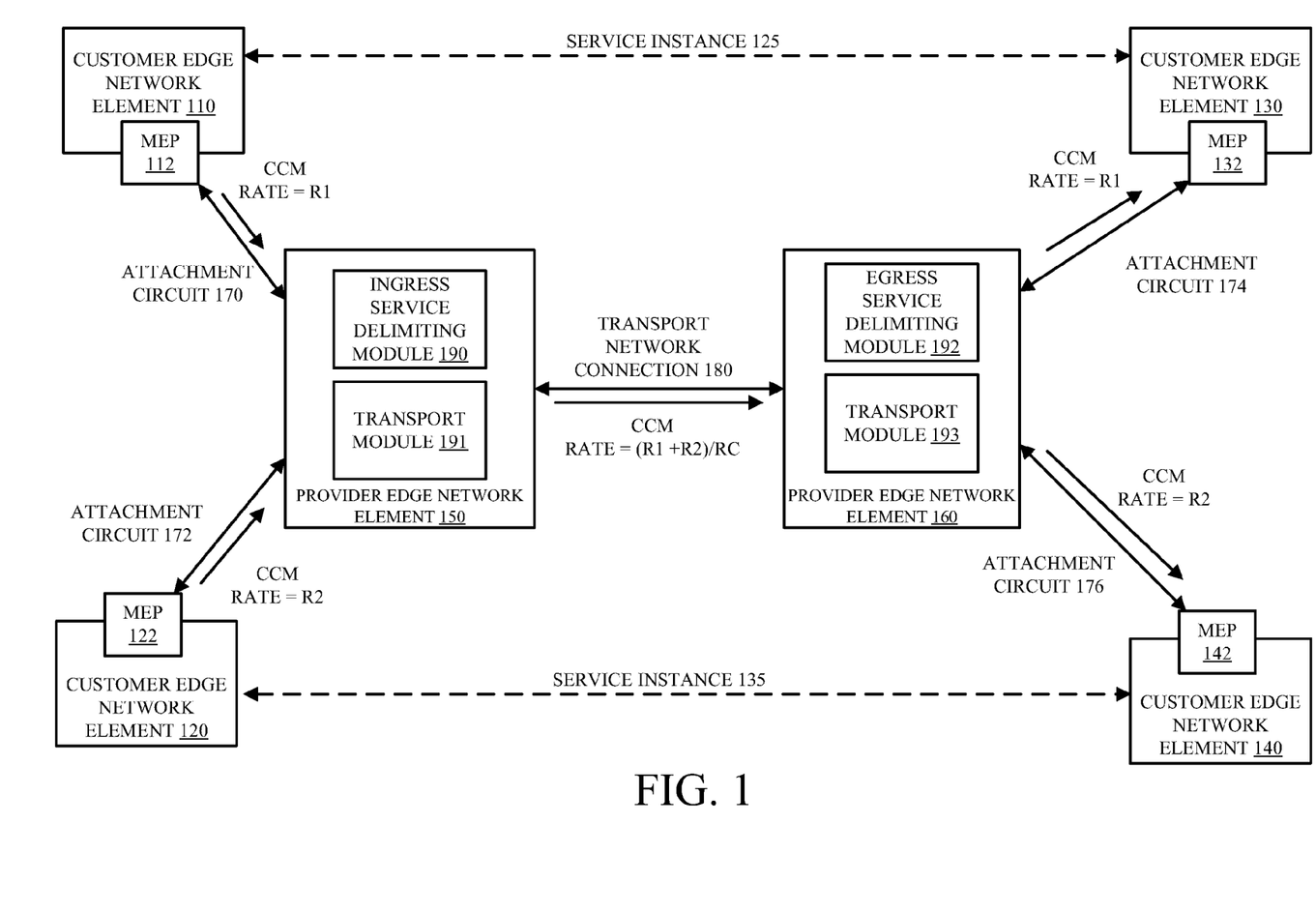
FIG. 1 illustrates an exemplary network with a reduced periodicity transmission rate of CC messages in an Ethernet service network according to one embodiment of the invention.

FIG. 1 illustrates an exemplary network with a reduced periodicity transmission rate of CC messages in an Ethernet service network according to one embodiment of the invention. FIG. 1 will be described with reference to the exemplary operations of FIG. 4. However, it should be understood that FIG. 1 can be performed by embodiments of the invention other than those discussed with reference to FIG. 4, and the embodiments discussed with reference to FIG. 4 can perform operations different than those discussed with reference to the FIG. 1.

FIG. 1 illustrates an exemplary VPLS (Virtual Private LAN Service) network with two Ethernet services instances, the service instance 125 and the service instance 135. While FIG. 1 illustrates an exemplary VPLS network, it should be understood that other networks are within the scope of the invention (e.g., networks that include Provider Backbone Bridges (PBBs)). VPLS provides a framework for provisioning Layer 2 Virtual Private Networks (L2VPNs). For example, in a VPLS network, the Local Area Network (LAN) at each site is extended to the edge of the provider network. The provider network emulates a switch (or bridge) to connect the customer LANs to create a single bridged LAN. For example, the Customer Edge (CE) network element 110 and the CE network element 130 are connected by the provider network (e.g., the Provider Edge (PE) network element 150 and the PE network element 160) to create a single service instance 125. Similarly, the CE network element 120 and the CE network element 140 are connected by the provider network to create a single service instance 135.

The Customer Edge (CE) network element 110 is coupled with the Provider Edge (PE) network element 150 through the attachment circuit 170. While not shown for simplicity purposes, the CE network element 110 may be coupled with the PE network element 150 through one or more access network elements. The CE network element 110 is coupled with a bridge module of the PE network element 150. The PE network element 150 connects the bridge module to an emulated LAN for the CE network element 110. For example, the service instance 125 is an emulated LAN between the CE network element 110 and the CE network element 130. The CE network element 130 is coupled with the PE network element 160 through the attachment circuit 174. While not shown in FIG. 1 for simplicity purposes, one or more subscriber computing end stations are coupled with the CE network element 110, and the CE network element 130. In addition, the CE network elements 110 and 130 may be geographically separate yet belong to the same organization (e.g., the CE network elements 110 and 130 are each at branch offices of the same company). For example, the CE network element 110 may be located at a branch office in San Francisco while the CE network element 130 may be located in a branch office in New York City.

In a similar fashion, the CE network element 110 is coupled with a bridge module of the PE network element 150 (through zero or more access network elements) through the attachment circuit 172. The PE network element 150 connects the bridge module to an emulated LAN for the CE network element 120. For example, the service instance 135 is an emulated LAN between the CE network element 120 and the CE network element 140. The CE network element 140 is coupled with the PE network element 160 through the attachment circuit 176. While not shown in FIG. 1 for simplicity purposes, one or more subscriber computing end stations are coupled with the CE network element 120, and the CE network element 140.

The PE network element 150 is coupled with the PE network element 160 through the transport network connection 180. The PE network elements 150 and 160 are each types of Ethernet service provider network elements. In addition, the CE network elements 110, 120, 130, and 140 are each types of Ethernet customer network elements. According to one embodiment of the invention, Ethernet service provider network elements are under control of the Ethernet service provider, while the Ethernet customer network elements are under control of a customer of the service provider.

In one embodiment of the invention, the transport network connection 180 may include one or more intra-Ethernet service provider network links, such as MAN links and/or WAN links. In addition, the transport network connection 180 may include one or more links designated for the service instance 125, and one or more links designated for the service instance 135. According to one embodiment of the invention, the transport network connection 180 is more expensive than the attachment circuit 170, the attachment circuit 172, the attachment circuit 174, or the attachment circuit 176. The CE network element 110 transmits and receives network traffic and CC messages through the attachment circuit 170. Similarly, the CE network element 130 transmits and receives network traffic and CC messages through the attachment circuit 174.

A maintenance end point (MEP) 112, which is associated with the service instance 125, is configured on the CE network element 110. Similarly, a MEP 132, which is also associated with the service instance 125, is configured on the CE network element 130. Thus, the MEP 112 and the MEP 132 are part of the same service instance 125. The CE network element 110 transmits CC messages to the PE network element 150 for the MEP 112 at a periodicity rate of R1 (e.g., one MEP message transmitted per 3 milliseconds). In one embodiment of the invention, the CC messages transmitted are Connectivity Check Messages (CCMs) conforming to the IEEE standard 802.1ag (hereinafter "802.1ag"). Each CC message includes a transmission interval rate, hereinafter referred to as the periodicity rate. In FIG. 1, the periodicity rate between the CE network element 110 and the PE network element 150 is R1 (e.g., one CC message transmitted every 3.3 milliseconds) (thus, the PE network element 150 expects a CC message from the CE network element at the rate R1).

The MEP 122, which is associated with the service instance 135, is configured on the CE network element 120. Similarly, a MEP 142, which is associated with the service instance 135, is configured on the CE network element 140. Thus, the MEP 122 and the MEP 142 are part of the same service instance 135. The CE network element 120 transmits CC messages to the PE network element 150 for the MEP 122 at a periodicity rate of R2 (e.g., one CC message transmitted every 10 milliseconds).

The PE network element 150 includes the ingress service delimiting module 190 and the transport module 191. According to one embodiment of the invention, the ingress service delimiting module 190 reduces the transmission rate of CC messages sent through the transport network connection 180. For example, the PE network element 150 transmits CC messages associated with the MEP 112 (of the CE network element 110) and the MEP 122 (of the CE network element 120) at a periodicity rate of (R1+R2)/RC (where RC is a repeat count, which will be described in greater detail later herein). Thus, the PE network element 150 transmits CC messages through the transport network connection 180 at a periodicity rate less than the periodicity rate of CC messages the PE network element 150 receives. In addition, as will be described in greater detail later herein, the PE network element 160 transmits CC messages to the endpoint of a service instance (e.g., MEP 132 of the CE network element 130) at the same periodicity rate the CE network element 110 transmits CC messages to the PE network element 150. Thus, even though the number of CC messages transmitted through the transport network is reduced, the nodes monitoring MEPs in a service instance are unaware of the reduction as CC messages continue to be transmitted and received at the endpoints (e.g., the MEP 112 and the MEP 132) at the expected periodicity rate.

Figure 3A:
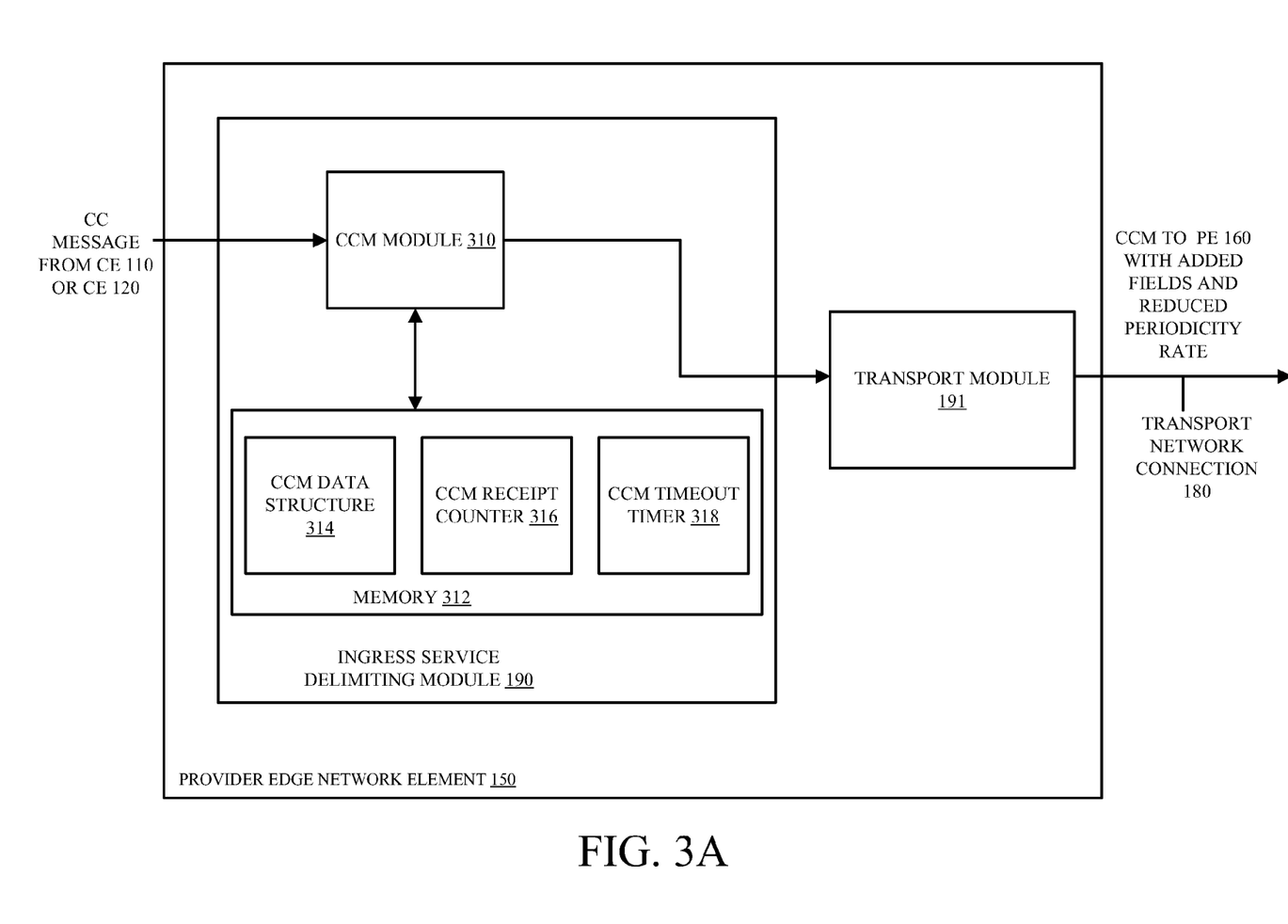
FIG. 3A is a block diagram illustrating an exemplary network element reducing the periodicity transmission rate of CC messages according to one embodiment of the invention.

FIG. 3A is an exploded view of the PE network element 150 according to one embodiment of the invention. The PE network element 150 includes the ingress service delimiting module 190 coupled with the transport module 191. The ingress service delimiting module 190 includes the CCM module 310 and the memory 312. The memory 312 stores the CCM data structure 314, the CCM receipt counter 316, and the CCM timeout timer 318. FIG. 3A will be described with reference to the exemplary operations of FIG. 4. However, it should be understood that FIG. 3A can perform operation by embodiments of the invention other than those discussed with reference to FIG. 4, and the embodiments discussed with reference to FIG. 4 can perform operations different than those discussed with reference to the FIG. 3A.

Figure 4:
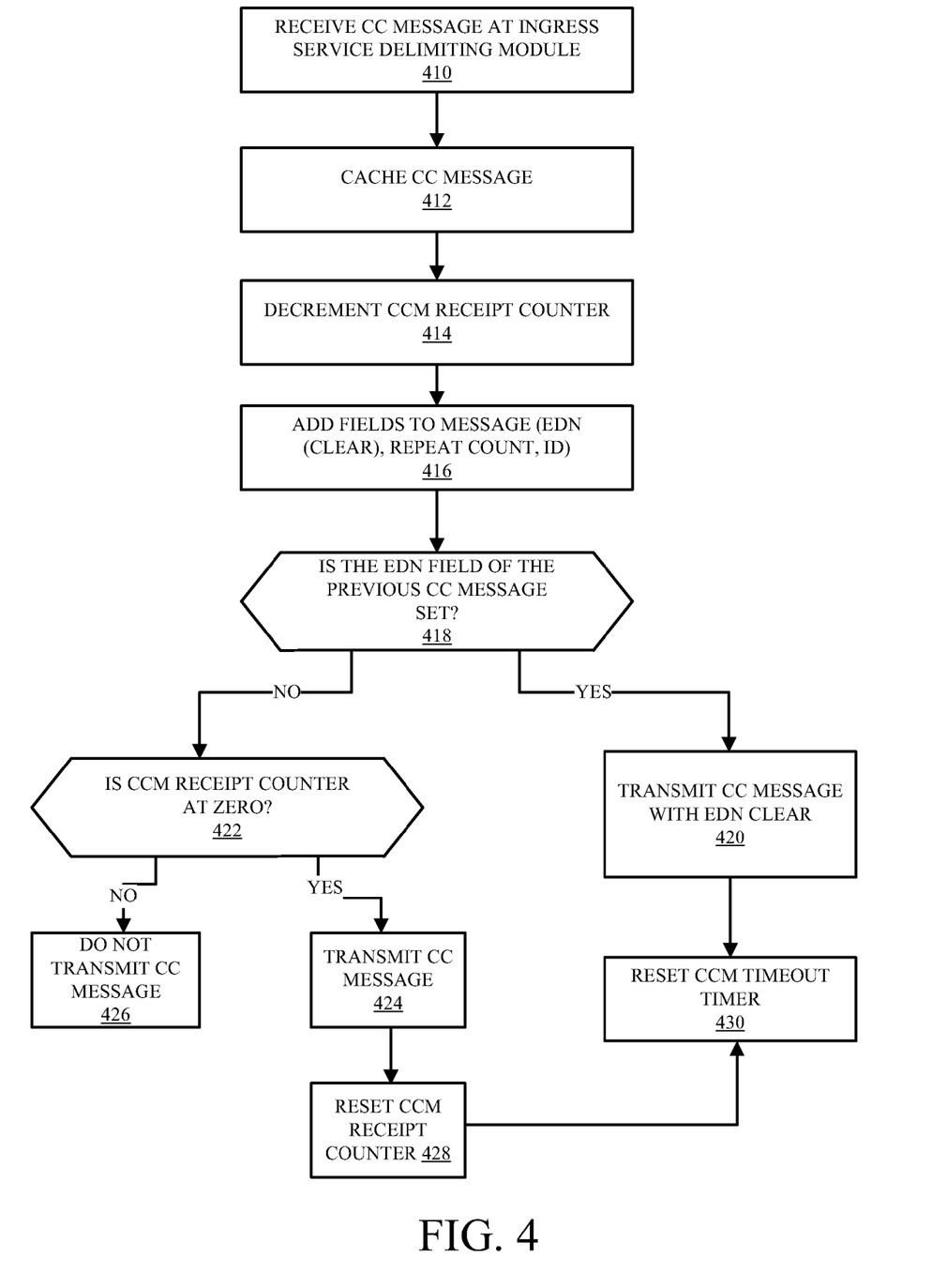
FIG. 4 is a flow diagram illustrating an exemplary method for reducing the periodicity transmission rate of CC messages according to one embodiment of the invention.

FIG. 4 is a flow diagram illustrating an exemplary method for reducing the periodicity transmission rate of CC messages according to one embodiment of the invention. At block 410, the ingress service delimiting module 190 of the PE network element 150 receives a CC message. For example, the ingress service delimiting module 190 receives a CC message from the CE network element 110 or the CE network element 120. For illustration purposes, for further discussion of FIG. 4, it will be assumed that the ingress service delimiting module 190 receives a CC message from the CE network element 110 associated with the MEP 112. Referring to FIG. 3A, the CC module 310 receives the CC message from the MEP 112 of the CE network element 110. According to one embodiment of the invention, the CC message includes a periodicity rate of R1 (thus, CC messages are expected to be received from the CE network element 110 at the rate of R1). It should be understood that the received CC message may optionally include a sequence number.

Flow moves from block 410 to block 412, where the ingress service delimiting module 190 caches the CC message. For example, referring to FIG. 3A, the CCM module 310 caches the CC message in the CCM data structure 314. Any number of mechanisms may be used to manage the CCM data structure 314 including caching only a certain amount of messages for each MEP (e.g., according to each MEPID). In one embodiment of the invention, the CCM data structure 314 stores one or more CC messages associated with a single MEP. According to one embodiment of the invention, the CCM data structure 314 is a CCM database as defined in the 802.1ag standard. Flow moves from block 412 to block 414.

At block 414, the ingress service delimiting module 190 decrements a CCM receipt counter that is associated with the MEP 112. For example, referring to FIG. 3A, the CCM module 310 decrements the CCM receipt counter 316 associated with the MEP 112. Thus, according to one embodiment of the invention, each MEP transmitting CC messages to the PE network element 150 has a separate CCM receipt counter. According to one embodiment of the invention, the CCM receipt counter 316 is a value associated with a repeat count (RC), which is used to reduce the number of CC messages transmitted through the transport network. For example, according to one embodiment of the invention, the CCM receipt counter 316 is equivalent to the repeat count minus X (where RC>X>=1). According to one embodiment of the invention, the CCM receipt counter indicates the number of CC messages a PE network element receives (e.g., the ingress service delimiting module 190 on the PE network element 150) from a particular MEP (e.g., MEP 112 on the CE network element 110) prior to transmitting a CC message through the transport network for that MEP (e.g., prior to transmitting a CC message for MEP 112 to the PE network element 160 over the transport network connection 180).

According to one embodiment of the invention, the repeat count is a value indicating the number of CC messages the egress service delimiting module 192 should transmit to a CE network element prior to receiving another CC message from the PE network element, which will be described in greater detail later herein. While in one embodiment of the invention the repeat count is configured (e.g., by a network administrator), in alternative embodiments of the invention the repeat count is automatically provisioned depending on the status of the network resources (e.g., depending on the load of the transport network).

Flow moves from block 414 to block 416. At block 416, the ingress service delimiting module 190 adds an explicit down notification (EDN) field (set to 0), a repeat count (RC), and a transaction ID (e.g., a MAC address of the PE network element 150) to the CC message. In one embodiment of the invention, the CCM data structure 314 is extended to support the EDN field, the RC field and the transaction ID field. Each of these fields is used by the egress service delimiting module 192, which will be described in greater detail later herein. Flow moves from block 416 to block 418.

At block 418, the ingress service delimiting module 190 determines whether the EDN field of the previous CC message sent to the PE network element 160 for the associated MEP (e.g., MEP 112) was set (e.g., set to 1) (i.e., the last CC message that was sent to the PE network element 160 for the MEP 112). If the received CC message was the first CC message received from CE network element 110 associated with the MEP 112 (e.g., the CCM data structure 314 does not include an entry for the MEP 112), or the previous CC message sent to the PE network element 160 was not set (e.g., set to 0), then flow moves to block 422. If the previous CC message sent to the PE network element 160 was set (e.g., set to 1) for the MEP, then flow moves to block 420. With reference to FIG. 3A, in one embodiment of the invention, the CCM module 310 determines, from the CCM data structure 314, whether the previous CC message included an EDN field of 1. As will be described in greater detail later herein, the CCM module 310 sets an EDN field to 1 if it detects a CCM receipt timeout (e.g., if the CCM module 310 does not receive any CC messages from the MEP 112 over the stated periodicity rate, the CCM module 310 sets the EDN field to 1). In addition, the CCM module 310 sets the EDN field to 1 if the ingress service delimiting module 190 determines that the MEP 112 is down and/or the connection between the PE network element 150 and the CE network element 120 is down. For example, if the port coupling the PE network element 150 and the CE network element 120 goes down and the MEP 112 is associated with that port, then the CCM module 310 sets the EDN field to 1.

At block 420, a CC message with a cleared EDN field is transmitted (e.g., an EDN field of 0) through the transport network (e.g., through the transport network connection 180). For example, with reference to FIG. 3A, the CCM module 310 generates a CC message from information in the CCM data structure 314 (e.g., from the CC message cached in block 412 and the fields added to the message in block 416) and passes the generated CC message to the transport module 191. According to one embodiment of the invention, the last CCM module 310 generates the CC message from the last CC message received and cached in the CCM data structure 314. The transport module 191 adds any required encapsulations for the transport network (e.g., layer 2 encapsulations, tunnel encapsulations, etc.), performs any additional processing, and transmits the generated CC message (with an EDN of 0) to the PE network element 160. In addition, it should be understood that if the cached CC message which was used to generate the transmitted CC message included a sequence number, the transmitted CC message includes that sequence number. Flow moves from block 420 to block 430, where the CCM timeout timer is reset to its initial value (e.g., to the periodicity rate value included in the received CC message).

At block 422, the ingress service delimiting module 190 determines whether the CCM receipt counter is at zero. For example, with reference to FIG. 3A, the CCM module 310 determines if the CCM receipt counter 315 is at zero for the MEP 112. If the CCM receipt counter is at zero, then flow moves to block 424, where a CC message with the additional fields (e.g., added in block 416) is transmitted over the transport network. For example, with reference to FIG. 3A, if the CCM module 310 determines the CCM receipt counter 315 is at zero for the MEP 112, the CCM module 310 generates a CC message from information in the CCM data structure 314 (e.g., from the CC message cached in block 412 and the fields added to the message in block 416) and sends it to the transport module 191. According to one embodiment of the invention, the last CCM module 310 generates the CC message from the last CC message received and cached in the CCM data structure 314. In addition, it should be understood that if the cached CC message which was used to generate the transmitted CC message included a sequence number, the transmitted CC message includes that sequence number The transport module 191 adds any required encapsulations for the transport network (e.g., layer 2 encapsulations, tunnel encapsulations, etc.). For example, in a VPLS network, the transport module 191 may map the generated CC message to a particular pseudowire and a particular egress port of the PE network element 150. It should be understood that different embodiments of the invention may use a different type of transport module 191 and the transport module 191 may perform operations differently in some embodiments of the invention. Thus, embodiments of the invention are independent of the type and function of the transport network.

If the CCM receipt counter is not at zero (e.g., it is greater than zero), then flow moves to block 426 where a CC message is not transmitted. It should be understood that in some embodiments of the invention, the PE network element 150 may continue to receive CC messages from a particular MEP (e.g., MEP 112) yet it does not transmit a CC message associated with that MEP over the transport network unless the CCM receipt counter 316 is at zero. Thus, it should be understood that the number of CC messages the PE network element 150 transmits through the transport network (e.g., through the intra-Ethernet service provider network links (MAN and/or WAN links)) is reduced. For example, the PE network element 150 receives CC messages from the MEP 112 at a periodicity rate (e.g., R1) that is higher than the periodicity rate (e.g., R1/RC) of CC messages it transmits through the transport network connection 180. Thus, the number of CC messages transmitted through the attachment circuit 170 for a particular end point of a service instance is greater than the number of CC messages transmitted through the transport network connection 180 for that end point of that service instance. Thus, it should be understood that bandwidth of the transport network is conserved. In addition, it should be understood that as the number of service instances increases (and thus the number of CC messages the PE network element 150 receives increases), the amount of bandwidth savings also increases. Thus, the scalability of increased service instances which employ CCM mechanisms is improved (e.g., the number of service instances may be increased without a corresponding increase in the CC message load on the provider network).

Flow moves from block 424 to block 428, where the CCM receipt counter is reset to its initial value, and flow moves to block 430. At block 430, the CCM timeout timer is reset to its initial value (e.g., e.g., to the periodicity rate value included in the received CC message).

It should be understood that the PE network element 150 performs similar operations as described in FIG. 4 for CC messages received from the MEP 122 of the CE network element 120 for the service instance 135. For example, the PE network element 150 receives CC messages from the MEP 122 at a periodicity rate (e.g., R2) that is higher than the periodicity rate (e.g., R2/RC) of CC messages it transmits through the transport network connection 180. Thus, according to one embodiment of the invention, the PE network element 150 transmits CC messages for the MEP 112 and the MEP 122 through the transport network connection 180 at a periodicity rate of (R1+R2)/RC.

Figure 2:
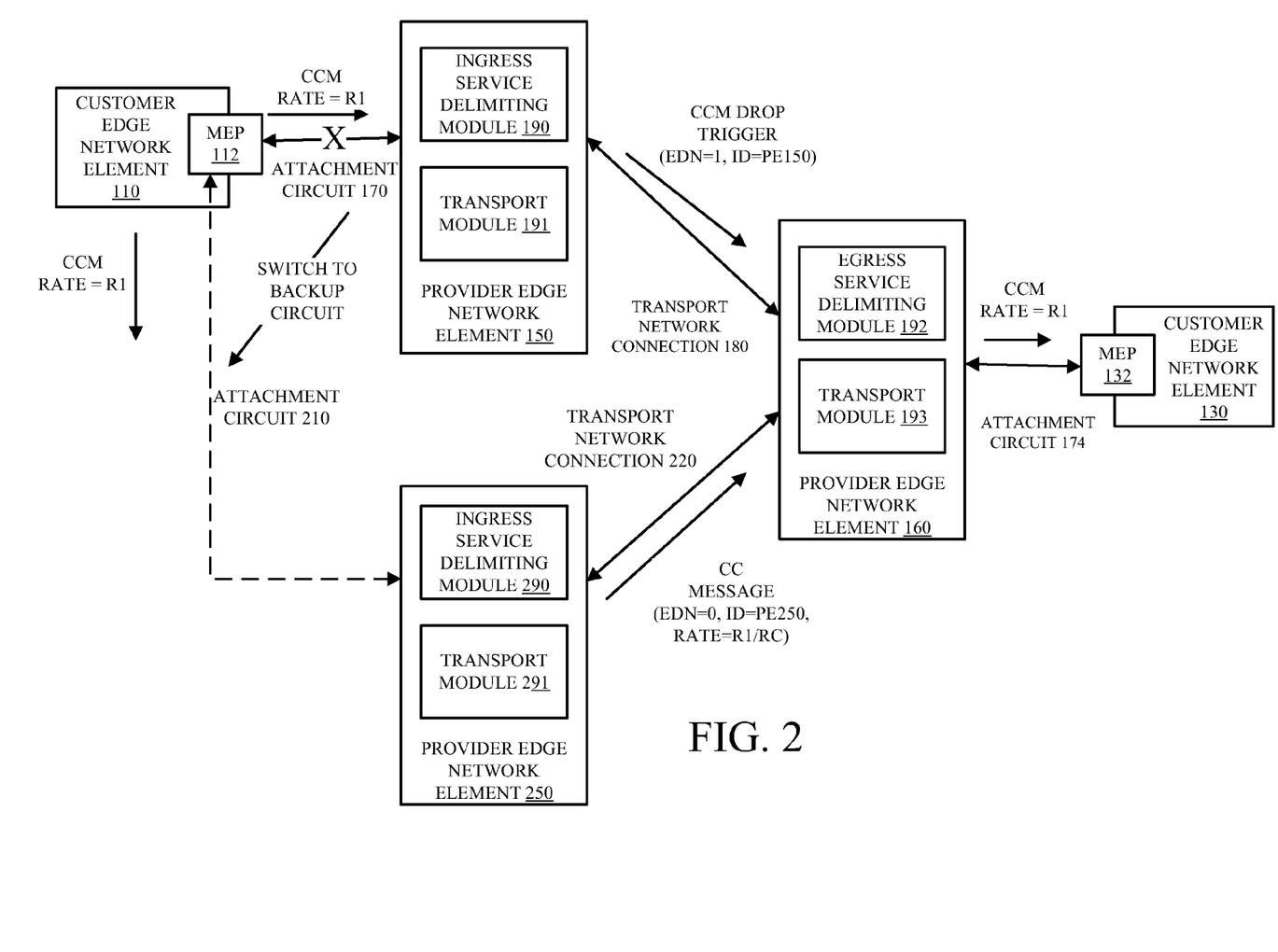
FIG. 2 illustrates an exemplary network with a reduced periodicity transmission rate of CC messages in a transport network connection where a customer edge network element is dual homed according to one embodiment of the invention.

FIG. 2 illustrates an exemplary VPLS network with a reduced periodicity transmission rate of CC messages in a transport network connection where a CE network element is dual homed according to one embodiment of the invention. FIG. 2 will be described with reference to the exemplary operations of FIG. 5. However, it should be understood that FIG. 2 can perform operation by embodiments of the invention other than those discussed with reference to FIG. 5, and the embodiments discussed with reference to FIG. 5 can perform operations different than those discussed with reference to the FIG. 2.

FIG. 2 includes the CE network element 110 (and the MEP 112) illustrated in FIG. 1. In addition, the CE network element 110 is coupled with the PE network element 150 via the attachment circuit 170, and the PE network element 150 is coupled with the PE network element 160 via the transport network connection 180. In addition, the CE network element 110 is dual homed to the PE network element 250. For example, if the attachment circuit 170 fails for some reason (e.g., an incorrectly configured Spanning Tree Protocol operating on the PE network element incorrectly blocks the port coupling the attachment circuit 170, the physical link carrying the attachment circuit 170 goes down, etc.), the CE network element 110 switches to the attachment circuit 210 to transmit data and CC messages to the PE network element 150. In this manner, even if the attachment circuit 170 is disabled, the CE network element 110 has access to the VPLS network and has access to the CE network element 130. The PE network element 250 includes the ingress service delimiting module 290 and the transport module 291, which operate in a similar fashion as the ingress service delimiting module 190 and the transport module 191. The PE network element 250 is coupled with the PE network element 160 over the transport network connection 220.

In FIG. 2, the attachment circuit 170 has failed (as indicated by the large "X" on the attachment circuit 170) and the CE network element 110 has switched to its secondary (e.g., backup) attachment circuit 210 to transmit and receive CC messages. Thus, the PE network element 150 does not receive CC messages from the MEP 112 over the attachment circuit 170. It should be understood that although the PE network element 150 may detect a CC message timeout rather quickly (e.g., after not receiving a CC message at a time when the periodicity rate R1 expires), the PE network element 160 does not detect a CC message timeout at the same rate. For example, the PE network element 160 expects to receive CC messages at the reduced periodicity rate (e.g., R1/RC). Therefore, in one embodiment of the invention, upon detecting a CC message timeout for a particular MEP, the ingress service delimiting module generates a CC message with an EDN field with a value of 1 for that MEP and transmits this message to the egress service delimiting module. A CC message with am EDN field set to a value of 1 notifies the egress service delimiting module of the CC message timeout and triggers the egress service delimiting module to stop transmitting CC messages for that MEP.

Figure 5:
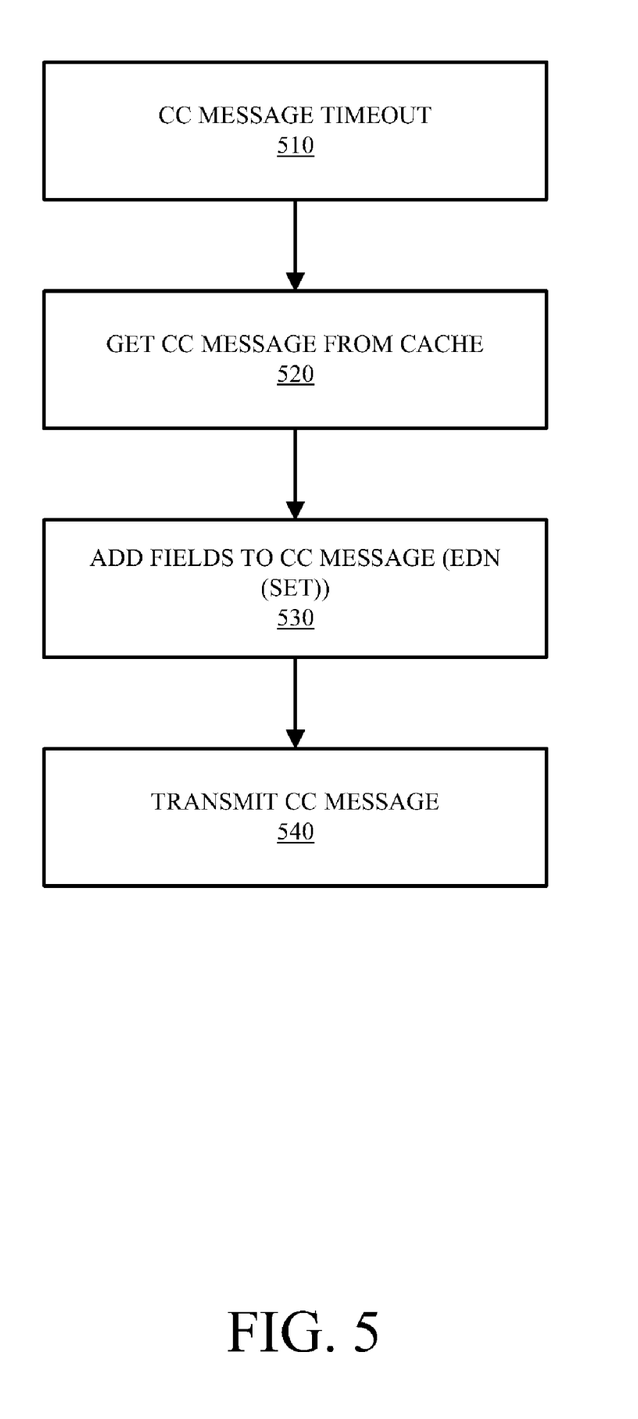
FIG. 5 is a flow diagram illustrating an exemplary method for determining a CC message timeout and triggering an explicit service instance down CC message according to one embodiment of the invention.

FIG. 5 is a flow diagram illustrating an exemplary method for determining a CC message timeout and triggering an explicit service instance down CC message according to one embodiment of the invention. At block 510, the PE network element 150 determines that the CC message has timed out. For example, the PE network element 150 has not received a CC message from the MEP 112 in the expected periodicity rate (e.g., rate R1). For example, with reference to FIG. 3A, the CCM module 310 determines that the CCM timeout timer 318 has expired. Flow moves from block 510 to block 520.

At block 520, the PE network element 150 reads a previously cached CC message associated with the timed out MEP (e.g., MEP 112). For example, with reference to FIG. 3A, the CCM module 310 reads an entry of the CCM data structure 314 for a previously cached CC message for the MEP 112. Flow moves from block 520 to block 530, where one or more fields are added to the message. For example, an EDN field is added to the message and set to a value of 1. In addition, a transaction ID field is added to the message and populated with a unique identifier of the PE network element 150 (e.g., a MAC address of the PE network element 150). Flow moves to block 540 where the CC message, with the additional fields, is transmitted to the PE network element 160. For example, with reference to FIG. 3A, the CCM module 310 generates a CC message with an EDN field set to 1 and a transaction ID field uniquely identifying the PE network element 150, and passes this message to the transport module 191 to be transmitted to the PE network element 160.

Referring back to FIG. 2, since the CE network element 110 is dual homed (e.g., the CE network element 110 is coupled with a backup PE network element 250 in case of failure of the attachment circuit 170 and/or the PE network element 150), the MEP 112 transmits CC messages through the attachment circuit 210 to the PE network element 250. According to one embodiment of the invention, the ingress service delimiting module 290 and the transport module 291 of the PE network element 250 perform in a similar manner as the ingress service delimiting module 190 and the transport module 191 of the PE network element 150. For example, the PE network element 250 transmits CC messages to the PE network element 160 via the transport network connection 220, at a reduced rate (e.g., at the rate of R1/RC, where RC is a rate count value). In addition, each CC message the PE network element 250 transmits to the PE network element 160 includes a transaction ID uniquely identifying the source of the CC message (e.g., a MAC address of the PE network element 250).

Thus, as illustrated in FIG. 2, the PE network element 160 receives a CC message from the PE network element 150 for the MEP 112 that includes an EDN field of 1. According to one embodiment of the invention, this CC message triggers the PE network element 160 to stop transmitting CC messages associated with the PE network element 150 to the CE network element 130. In addition, the PE network element 160 also receives CC messages from the PE network element 250 for the MEP 112 (that do not include an EDN field of 1). According to one embodiment of the invention, the PE network element 160 treats CC messages received from different Ethernet service provider network elements (e.g., as identified by the transaction identifier) separately. For example, the explicit MEP down notification message sent by the PE network element 150 for the MEP 112 does not affect the CC messages sent by the PE network element 250 for the MEP 112. In other words, even though the PE network element 160 receives a message which triggers the PE network element 160 to stop transmitting CC messages from the PE network element 150 for a particular MEP, this MEP down message only applies for those CC messages, and not to the CC messages received from the PE network element 250 for that MEP.

Figure 6A:
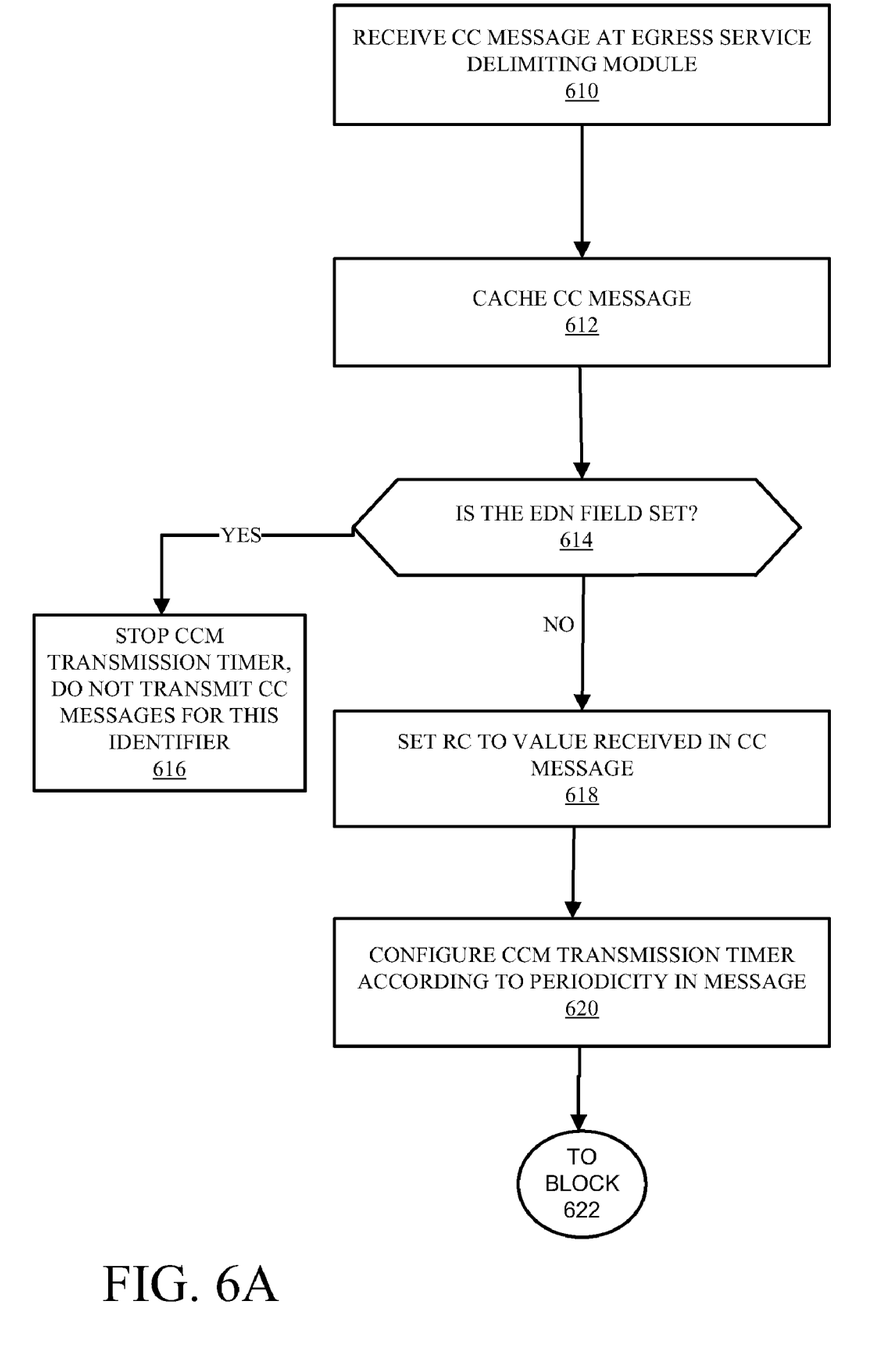
FIGS. 6A and 6B are flow diagrams illustrating an exemplary method for processing CC messages received at the reduced periodicity transmission rate of FIG. 4 and processing the explicit service instance down CC message of FIG. 5, according to one embodiment of the invention.
Figure 6B:
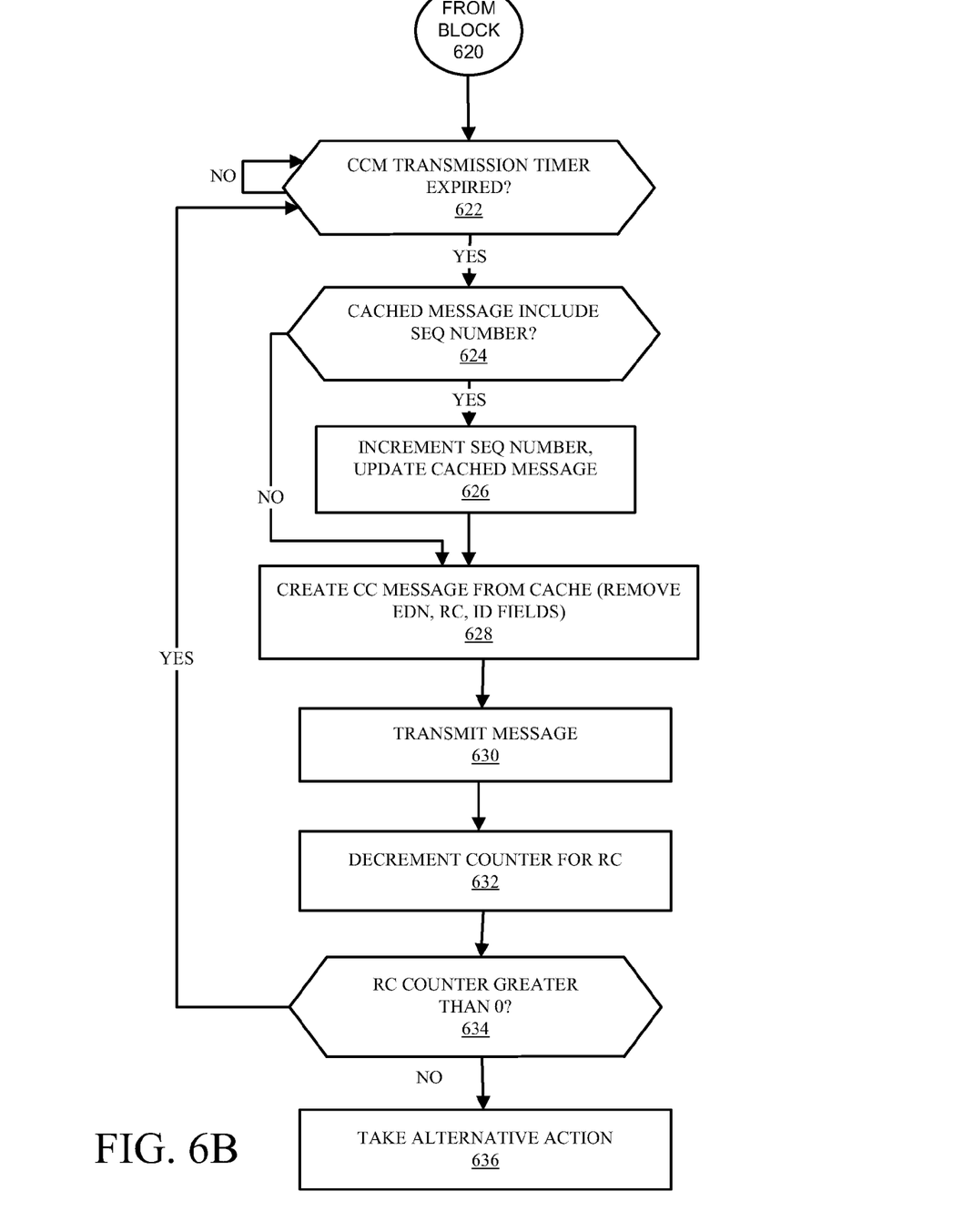

FIGS. 6A and 6B are flow diagrams illustrating an exemplary method for processing CC messages received at the reduced periodicity transmission rate of FIG. 4 and processing the explicit service instance down CC message of FIG. 5, according to one embodiment of the invention. For example, in one embodiment of the invention, the operations of FIGS. 6A and 6B may be performed by the PE network element 160. At operation 610, an egress servicing delimiting module (e.g., the egress servicing delimiting module 192) receives a CC message associated with a particular MEP. According to one embodiment of the invention, the received CC message includes the EDN field, the repeat count field, and the transaction identifier field, or any combination of the EDN field, the repeat count field, and the transaction identifier field. In addition, in some embodiments of the invention, the received CC message was transmitted at a reduced periodicity transmission rate (i.e., the received CC message was not transmitted at the original periodicity transmitted rate included in the CC message). Flow moves from block 610 to block 612.

Figure 3B:
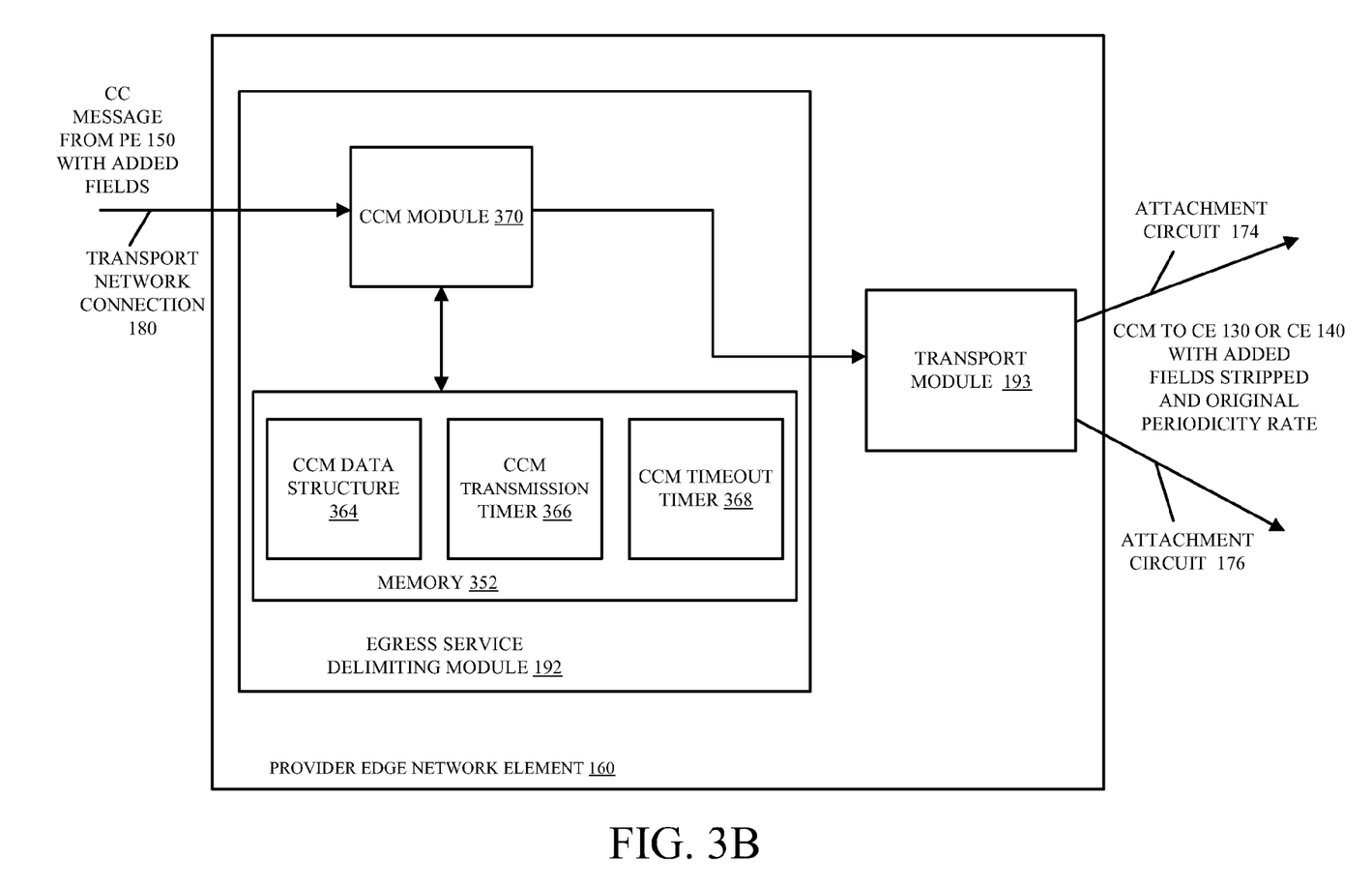
FIG. 3B is a block diagram illustrating an exemplary network element receiving the reduced periodicity transmission rate of CC messages of FIG. 3A, and transmitting CC messages at the original periodicity transmission rate according to one embodiment of the invention.

FIG. 3B is a block diagram illustrating an exemplary Ethernet service provider network element receiving the reduced periodicity transmission rate of CC messages of FIG. 3A, and transmitting CC messages at the original periodicity transmission rate according to one embodiment of the invention. The PE network element 160 of FIG. 3B includes the egress service delimiting module 192 coupled with the transport module 193. The egress service delimiting module 192 includes the CCM module 370 coupled with the memory 352. The memory 352 stores the CCM data structure 364, the CCM transmission timer 366, and the CCM timeout timer 368. According to one embodiment of the invention, the CCM transmission timer 366 indicates the amount of time between transmission of CC messages to a CE network element. For example, the CCM transmission timer 366 may be equivalent to the periodicity rate included in the CC message (thus, for example, if the periodicity rate is R1, then the CCM transmission timer 366 may expire at R1 time). According to one embodiment of the invention, the CCM timeout timer 368 indicates the amount of time before the egress service delimiting module 192 determines a CC message timeout (e.g., the time to declare a CC message timeout for CC messages sent by the PE network element 150).

At block 612, the egress servicing delimiting module caches the received CC message. For example, with reference to FIG. 3B, the egress servicing delimiting module 192 caches the received CC message from the PE network element 150 (e.g., with the added fields) into the CCM data structure 364. Flow then moves to block 614, where the egress servicing delimiting module determines whether the EDN field of the received CC message is set (e.g., whether the EDN field has a value of 1). If the EDN field has a value of 1, flow moves to block 616 where the egress service delimiting module 192 stops the CCM transmission timer (e.g., the CCM module 370 stops the CCM transmission timer 366), and does not transmit any CC messages for the transaction associated with the CC message. Thus, for example referring to FIG. 2, the PE network element 160 does not transmit any CC messages to the CE network element 130 for the MEP 112 from the PE network element 150 upon receiving a CC message from the PE network element 150, for the MEP 112, that includes an EDN field with a value of 1 and a transaction identifier uniquely identifying the PE network element 150.

If the EDN field is not set (e.g., the EDN field has a value of 0), then flow moves to block 618. At block 618, in one embodiment of the invention, a repeat counter is set to the repeat count value in the CC message. In an alternative embodiment of the invention, the repeat count field of the cached CC message (e.g., cached during operation of block 612) is used as the repeat counter. Flow moves from block 618 to block 620.

At block 620, the CCM transmission timer is configured according to the periodicity rate included in the CC message. For example, with reference to FIG. 3B, the CCM module 370 configures the CCM transmission timer 366 according to the periodicity rate (e.g., R1) included in the CC message. Flow moves to block 622. At block 622, it is determined whether the CCM transmission timer has expired. For example, with reference to FIG. 3B, the CCM module 370 determines whether the CCM transmission timer 366 has expired. If the CCM transmission timer has expired, flow moves to block 624. If the CCM transmission timer has not expired, flow moves back to 622.

At block 624, a determination is made whether the cached CCM message includes a sequence number. For example, with reference to FIG. 3B, the CCM module 370 accesses the CCM data structure 364 to determine whether the latest cached CC message associated with the MEP includes a sequence number. If the cached CC message includes a sequence number, then flow moves to block 626. However, if the cached CC message does not include a sequence number, then flow moves to block 628. At block 626, the sequence number is incremented and the cached message is updated to reflect the incremented sequence number. Flow moves from block 626 to block 628.

At block 628, a CC message is created from the cache where the extra fields (e.g., the EDN filed, the repeat count field, and the transaction identifier field) are stripped from the message. If the cached message includes a sequence number, the created CC message includes that sequence number. Flow moves from block 628 to block 630, where the created CC message is transmitted. For example, with reference to FIG. 3B, the CCM module 370 accesses the CCM data structure 364 and generates a CC message without the extra fields and passes the generated CC message to the transport module 193. The transport module 193 adds any required encapsulations for the attachment circuit (e.g., the attachment circuit 174), performs any additional processing, and transmits the generated CC message to the CE network element 130. Flow moves from block 630 to the block 632.

At block 632, the repeat counter is decremented. For example, in one embodiment of the invention the CCM module 370 decrements the value of the repeat count field by 1 upon transmitting each CC message. Flow moves to block 634, where a determination is made whether the repeat counter is greater than zero. For example, the CCM module 370 determines if the repeat counter is greater than zero. If the repeat counter is not greater than zero, then flow moves to block 636, where alternative action is taken (e.g., the PE network element 160 may determine a CC message timeout, the PE network element 160 may readjust the repeat counter, etc.). If the repeat counter is greater than zero, then flow moves back to 622. Thus, for example, for a repeat count number of times (as indicated in the repeat count field of the received CC message), the PE network element 160 transmits a CC message to the MEP 132 (for the service instance 125) at the original periodicity rate (e.g., rate R1). It should be noted that at any time during the operations of blocks 622-

636, the egress service delimiting module 192 may receive a CC message with an EDN field set (e.g., an EDN filed of 1) which overrides the operations of the blocks 622-636. In other words, a CC message with an EDN field of 1 associated with a particular MEP and with a particular ingress service delimiting module, triggers the egress service delimiting module to stop transmitting CC messages for that MEP and ingress service delimiting module.

While embodiments of the invention have been described in relation to a VPLS network, in alternative embodiments of the invention a different network may be used (e.g., a standard Ethernet network, a Provider Backbone network, etc.). Additionally, while embodiments of the invention have described reducing the periodicity rate of CC messages transmitted through an Ethernet service provider network, in alternative embodiments of the invention the periodicity rate of CC messages may be reduced in an Ethernet customer network (e.g., within a LAN). In addition, while embodiments of the invention have been described with reducing the transmission rate of CC messages (e.g., 802.1ag CC messages), embodiments of the invention described herein may also be used for reducing the transmission rate of different types of messages (e.g., other keep-alive messages, control messages, operations, administration, and maintenance (OAM) messages, etc.).

It should be understood that the CE network elements 130 and 140, via the MEPs 132 and 142, transmit CC messages to the MEPs 112 and 122 respectively. In addition, the PE network element 160 supports an ingress service delimiting module and the PE network element 150 supports an egress service delimiting module.

In addition, in one embodiment of the invention, the PE network element 150 and the PE network element 160 agree to support the reduced periodicity rate and the added fields to the CC messages. For example, in some embodiments of the invention these capabilities are signaled (e.g., through Label Distribution Protocol (LDP), GMPLS, etc.). In other embodiments of the invention, a network administrator supporting the PE network elements 150 and 160 configures each PE network element to support the reduced periodicity rate and the added fields to the CC messages.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for reducing a number of CC (Connectivity Check) messages transmitted in a provider network, wherein a first customer network element is coupled with a second customer network element through the provider network, wherein the provider network includes a first service provider network element coupled with a second service provider network element, the method comprising:

receiving a plurality of first CC messages from the first customer network element at a first periodicity rate at the first service provider network element, wherein the plurality of first CC messages are destined for the second customer network element and are associated with the first customer network element; and transmitting a set of one or more second CC messages to the second service provider network element through the provider network at a second periodicity rate, wherein the second periodicity rate is smaller than the first periodicity rate, wherein the set of second CC messages are each associated with the first customer network element, and wherein each of the set of second CC messages includes a repeat count value that indicates a number of CC messages associated with the first customer network element that the second service provider network element is to transmit to the second customer network element at the first periodicity rate.

2. The method of claim 1, further comprising:

storing the received plurality of first CC messages in a CCM (Continuity Check Message) data structure on the first service provider network element;

detecting that the first customer network element has not transmitted CC messages destined for the second customer network element for a time of the first periodicity rate;

obtaining a stored version of a CC message previously received from the first customer network element that is destined for the second customer network element; and transmitting a CC message to the second service provider network element that indicates that the first service provider network element has stopped receiving CC messages from the first customer network element that are destined to the second customer network element.

3. The method of claim 1, wherein the first customer network element is dual homed with a third service provider network element, wherein the third service provider network element is coupled with the second service provider network element, the method further comprising:

receiving a plurality of third CC messages from the first customer network element at the first periodicity rate at the third service provider network element, wherein the plurality of third CC messages are destined for the second customer network element and are associated with the first customer network element;

storing the received CC messages in a CCM (Continuity Check Message) data structure on the third service provider network element;

adding a repeat count field to the stored CC message in the CCM data structure on the third service provider network element;

adding a transaction identifier field to the stored CC message in the CCM data structure on the third service provider network element and setting the transaction identifier field with a value uniquely identifying the third service provider network element;

reducing the first periodicity rate to create a third periodicity rate, wherein the third periodicity rate is smaller than the first periodicity rate;

transmitting a set of one or more fourth CC messages to the second service provider network element over the provider network at the third periodicity rate, wherein each transmitted CC message includes the transaction identifier uniquely identifying the third service provider network element and a repeat count value in the repeat count field that indicates a number of CC messages that the third service provider network element is to transmit to the second customer network at the first periodicity rate.

4. A service provider network element to reduce a number of CC (Connectivity Check) messages transmitted in a provider network, comprising:
an ingress service delimiting module including,
a CCM (Connectivity Check Message) module to perform the following:
receive CC messages from a first customer network element destined for a second customer network element at a first periodicity rate and store those CC messages in a CCM data structure,
reduce the first periodicity rate to create a second periodicity rate, wherein the second periodicity rate is smaller than the first periodicity rate, and
add a repeat count value to a set of one or more of the received CC messages that indicates a number of CC messages associated with the first customer network element that a different service provider network element is to transmit to the second customer network element at the first periodicity rate, and
a memory coupled with the CCM module, the memory to store the CCM data structure; and
a transport module coupled with the ingress service delimiting module, the transport module to transmit the set of CC messages to the different service provider network element at the second periodicity rate.

5. The service provider network element of claim 4, wherein the CCM module further is to determine whether an absence of a CC message from the first customer network element exceeds a CCM timeout timer, wherein the CCM module is further to add an explicit down notification field to the set of CC messages and set a value for the explicit down notification field to indicate whether the CCM timeout timer has expired.

6. The service provider network element of claim 4, wherein the second periodicity rate is to be configured by a network administrator.

7. A service provider network element to process CC (Connectivity Check) messages, comprising:
an egress service delimiting module including,
a CCM (Connectivity Check Message) module to receive CC messages transmitted from another service provider network element that are associated with a first customer network element and destined for a second customer network element and to store those CC messages in a CCM data structure, wherein each received CC message includes a first periodicity rate and a repeat count value, wherein each received CC message is received at a second periodicity rate that is lower than the first periodicity rate, wherein the CCM module further is to create a number of CC messages from the CCM data structure according to the repeat count value and cause those created CC messages to be transmitted at the first periodicity rate, and
a memory coupled with the CCM module, the CCM module to store the CCM data structure; and
a transport module coupled with the egress service delimiting module, the transport module to transmit the created CC messages to the second customer network element.

8. The service provider network element of claim 7, wherein the CCM module further is to stop transmission of the created CC messages to the customer network element if it determines that a CC message associated with the first customer network element received from the another service provider network element indicates that the another service provider network element has stopped receiving CC messages associated with the first customer network element that are destined to the second customer network element.

9. The service provider network element of claim 7, wherein the CCM module further is to distinguish processing CC messages received from different sources based on a transaction identifier included in each received CC message.

10. The service provider network element of claim 7, wherein the number of created CC messages is equivalent to the repeat count value.

11. A method in a first service provider network element, wherein the first service provider network element is coupled with a second service provider network element that itself is coupled with a first customer network element, and wherein the first service provider network element is coupled with a second customer network element, the method comprising:
receiving a first CC (Connectivity Check) message from the second service provider network element, the first CC message being associated with the first customer network element and destined for the second customer network element, the first CC message including a periodicity rate and a repeat count value; and
in response to receiving the first CC message, transmitting a plurality of CC messages associated with the first customer network element to the second customer network element at the periodicity rate included in the first CC message, wherein a number of the plurality of CC messages transmitted to the second customer network element is based on the repeat count value included in the first CC message.

12. The method of claim 11, further comprising:
responsive to receiving a second CC message from the second service provider network element that indicates that the first service provider network element has stopped receiving CC messages from the first customer network element that are destined for the second customer network element, stopping transmitting the plurality of CC messages to the second customer network element.

13. The method of claim 11, further comprising:
wherein the first CC message that is received from the second service provider network element includes a transaction identifier that identifies the second service provider network element;
receiving a second CC message from a third service provider network element, the second CC message being associated with the first customer network element and destined for the second customer network element, the second CC message including a periodicity rate, a repeat count value, and a transaction identifier that identifies the third service provider network element;
in response to receiving the second CC message, transmitting a plurality of CC messages associated with the first customer network element to the second customer network element at the periodicity rate included in the second CC message, wherein a number of the plurality of CC messages transmitted to the second customer network element is based on the repeat count value included in the second CC message;
responsive to receiving a third CC message from the second service provider network element that indicates that the first service provider network has stopped receiving CC messages from the first customer network element that are destined for the second customer network element, wherein the third CC message includes the transaction identifier that identifies the second service provider network element, stopping transmitting the plurality of CC messages to the second customer network element for the second service provider network element while continuing to transmit the plurality of CC messages to the second customer network element for the third service provider network element.

* * * * *

UNITED STATES PATENT AND TRADEMARK OFFICE
CERTIFICATE OF CORRECTION

PATENT NO.        : 8,018,863 B2
APPLICATION NO.   : 12/207065
DATED             : September 13, 2011
INVENTOR(S)       : Kini et al.

It is certified that error appears in the above-identified patent and that said Letters Patent is hereby corrected as shown below:

In Column 8, Line 23, delete "number The" and insert -- number. The --, therefor.

In Column 13, Line 2, delete "filed" and insert -- field --, therefor.

Signed and Sealed this
Tenth Day of January, 2012

David J. Kappos
*Director of the United States Patent and Trademark Office*